(12) United States Patent
Vetro et al.

(10) Patent No.: US 6,266,443 B1
(45) Date of Patent: Jul. 24, 2001

(54) OBJECT BOUNDARY DETECTION USING A CONSTRAINED VITERBI SEARCH

(75) Inventors: Anthony Vetro, Staten Island, NY (US); Huifang Sun, Cranbury, NJ (US); I-Jong Lin, Princeton, NJ (US); Sun-Yuan Kung, Princeton, NJ (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 09/219,062

(22) Filed: Dec. 22, 1998

(51) Int. Cl.$^7$ .................................................. G06K 9/48
(52) U.S. Cl. .............................................. 382/199
(58) Field of Search ................................. 382/199, 200, 382/201, 202, 203, 107, 226, 227, 228

(56) References Cited

U.S. PATENT DOCUMENTS

| | | | |
|---|---|---|---|
| 4,959,714 | * 9/1990 | Lo et al. | 358/125 |
| 5,103,488 | * 4/1992 | Gemello et al. | 382/22 |
| 5,974,521 | * 10/1999 | Akerib | 712/11 |
| 6,002,722 | * 12/1999 | Wu | 375/295 |

FOREIGN PATENT DOCUMENTS

0817495 A2    1/1998 (EP) ............................... H04N/7/26

OTHER PUBLICATIONS

Dimitriadis et al.; "Boundary Detection in Images Using a Two–Component Model"; Proceeding of the Mediterranean Electrotechnical Conference; 1983, pp. 1–2.

* cited by examiner

*Primary Examiner*—Andrew W. Johns
*Assistant Examiner*—Seyed Azarian
(74) *Attorney, Agent, or Firm*—Dirk Brinkman

(57) ABSTRACT

A method detects a boundary in a sequence of two-dimensional images where each image has multiple intensity value points. Filtering and motion analysis is applied on each image to produce motion enhanced images. Initial search parameters are determined from a dynamic snake model applied to the motion enhanced images. Each motion enhanced image is searched for a potential boundary using the search parameters. The potential boundary is projected into the motion enhanced image of a previous, current, and next image, and the search parameters of the previous, current, and next images are updated. The searching, projecting, and updating repeat until a predetermined level of convergence is reached.

24 Claims, 4 Drawing Sheets

OBJECT BOUNDARY DETECTION USING A CONSTRAINED VITERBI SEARCH

FIELD OF THE INVENTION

This invention relates generally to boundary detection, and more particularly, to segmenting objects in a video sequence to obtain video object planes.

BACKGROUND OF THE INVENTION

Older video standards, such as ISO MPEG-1 and MPEG-2, are relatively low-level specifications primarily dealing with the temporal and spatial compression of video signals. With these standards, one can achieve high compression ratios over a wide range of applications.

Newer video coding standards, such as MPEG-4, see "Information Technology—Generic coding of audio/visual objects," ISO/IEC FDIS 14496-2 (MPEG4 Visual), November 1998, allow arbitrary-shaped objects to be encoded and decoded as separate video object planes (VOP's). These emerging standards are intended to enable multimedia applications, such as interactive video, where natural and synthetic materials are integrated, and where access is universal. For example, one might want to "cut-and-paste" a moving figure from one video to another. In order to identify the figure, the video must first be "segmented." Given the amount of video, both archived and newly acquired, it is desirable for the segmentation process to be either fully automatic or semi-automatic.

In the semi-automatic case, one may provide a segmentation for the first frame. The problem then becomes one of object tracking. In the automatic case, the problem is to first identify the object, then to track the object. In either case, the segmentation process should attempt to minimize the input needed by the user, obviously, no input is optimal.

With VOP's, each frame of a video sequence is segmented into arbitrarily shaped image regions. Each VOP describes a video object in terms of, for example, shape, motion, and texture. The exact method of producing VOP's from the source imagery is not defined by the standards. It is assumed that "natural" objects are represented by shape information, in addition to the usual luminance and chrominance components. Shape data can be provided as a segmentation mask, or as a gray scale alpha plane to represent multiple overlaid objects. Because video objects vary extensively with respect to low-level features, such as, optical flow, color, and intensity, VOP segmentation is a very difficult problem.

A number of segmentation methods are known. Region-based segmentation methods include mesh-based, motion model-based, and split-and-merge. Because these methods rely on spatial features, such as luminance, they may produce false contours, and in some cases, foreground objects may be merged into the background. More recently, morphological spatio-temporal segmentation has been used. There, information from both the spatial (luminance) and temporal (motion) domains are tracked using vectors. This complex method might erroneously assign a spatial region to a temporal region, and the method is difficult to apply to a video sequence including more than one object.

SUMMARY OF THE INVENTION

A search method detects object boundaries in a sequence of two-dimensional images. In the sequence, each image has multiple intensity value points. Filtering and motion analysis are applied on each image to produce motion enhanced images. Initial search parameters are determined from a dynamic snake model applied to the motion enhanced images.

Each motion enhanced image is searched for a potential boundary using the search parameters. In one aspect of the event, the search is performed by a constrained Viterbi method. The potential boundary is projected into the motion enhanced image of a previous, current, and next image, and the search parameters of the previous, current, and next images are updated. The searching, projecting, and updating repeat until a predetermined level of convergence is reached.

DETAILED DESCRIPTION OF PREFERRED EMBODIMENTS

Introduction

Figure 1:
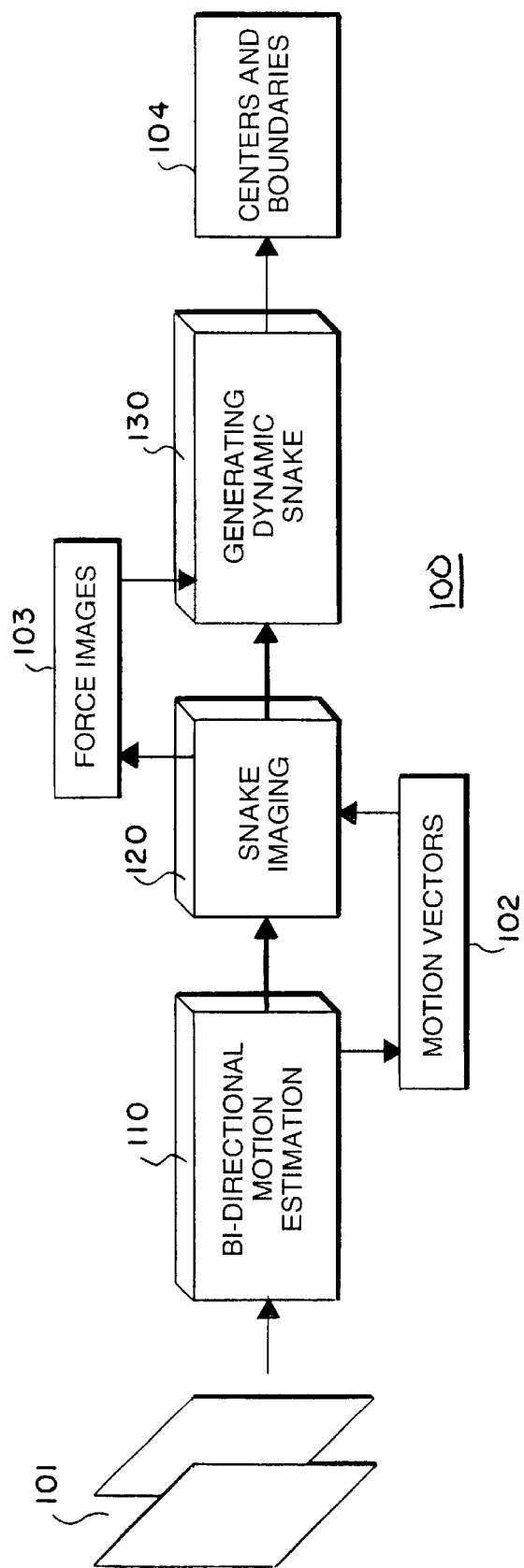
FIG. 1 is a flow diagram of a motion estimation phase for producing coarse object boundaries.

We describe an innovative system for segmenting objects represented in a sequence of video frames. In particular, we focus on boundary estimation as a means for segmenting video objects. As stated above, video object plane (VOP) segmentation is a well known and difficult problem.

One way of stating the problem is as follows. Given an image and an object which projects its intensities into the image, find the boundary of the object within the image. Although the solution is rather intuitive for human sight, the problem is an ill-posed computational problem with respect to the nature of objects and high-level knowledge of object make-up. Given that one has a two dimensional space which has an intensity function defined at successive time instants, one must infer the object projections into the space from the intensity function.

Our solution to this problem is given in the form of an area, or closed contour. The contour shows the area of projection of the object, or a boundary whose interior encloses this area.

An extension of the problem can be stated as follows. Given that one has a three dimensional space which has an intensity function defined over it, infer the boundary of the object projections into the space by the intensity function. In other words, video object segmentation must find the region in each of the still frames of the video sequence which correspond to the given object.

Our solution to the extended problem integrates the regions in question to define a volume which corresponds to the correct segmentation of the object out of the video sequence, and to locate a corresponding surface whose interior is the volume in question.

Constrained Viterbi Search

In our solutions, we use a constrained Viterbi search to solve these problems efficiently and effectively. The constrained Viterbi search links together visually important information in the sequence, integrates object tracking results, correlates estimates through time, and enables motion analysis.

In our constrained version, we map the classic Viterbi method algorithm onto an image through, for example, polar coordinates. We use polar coordinates in this case because the boundary we are looking for in the segmentation problem is somewhat circular, or more generally "roundish." Given a properly formulated score function, a center point, and a point on the path, our constrained Viterbi search finds the maximum score of a path that encircles a central point. When paths are scored with respect to an enhanced image, the method finds the optimal contour that encircles the center point. This contour is a prime candidate for an object boundary at the pixel-level. It should be noted that other constraints could be specified to search for boundaries which have contours other than circles.

Temporal Training

Because a video sequence exists within a temporal continuum, our system extends the constrained Viterbi search beyond mere iterative refinement to temporal training. In our temporal training, the constrained Viterbi search reflects temporal correlation of the time-wise object boundary through the adaptation of its parameters, i.e., enhanced images, score function parameters, and trellis structures.

Through feedback, we not only iteratively improve the boundary estimates, but also correlate each frame's estimation process through time. Images of one frame are enhanced with projections of boundary estimates from past and future frames. Parameters of score function that encode the expected object radii are adjusted to urge the dynamic programming search to more time consistent results. The estimated object radius also warps the Viterbi trellis structure to push boundary estimates away from the center.

Through these different feedback mechanisms, the temporal training of our system parametrically links together separate passes for each frame to extend the scope of our constrained Viterbi optimization from a single image to the whole object boundary through time.

System Overview

Our system has two distinct phases. FIG. 1 shows a first phase 100 that performs coarse segmentation using motion estimation. The coarse segmentation is refined in the second phase shown in FIG. 2 to produce final object boundaries. The refined final segmentation can be passed to, for example, a MPEG-4 encoder.

Phase I: Coarse Boundary Estimation

Motion Estimating

The first phase 100, takes a video sequence as input, e.g., frames 101. Each frame is partitioned into blocks, for example, blocks of 16×16 pixels. Bidirectionality motion estimation 110 is performed on each block to produce a field of motion vectors 102. For each block, we perform motion estimation twice, forward and backward in time, to derive a 4D motion field for each frame 101.

Snake Imaging

Using snake imaging 120, we derive a force image 103 from the 4D combined forward and backward motion field information 102. In a pseudo-physical system, snakes can be modeled as a linearly linked set of masses. A gradient descent optimization can simulate the forces on the linked masses so that they reach their lowest potential. The force images 103 are compatible with snakes, i.e., 1D edge images. To reduce the 4D motion field to the 1D field (intensity map), we both reduce dimensionality and enhance data resilience to noise with principal component analysis (PCA), see Lin et al. in "A principal component clustering approach to object oriented motion segmentation and estimation," Journal of VLSI Signal Processing (2)17:163–187, November 1997.

Generating Dynamic Snake

After deriving the snake force images 103, object boundaries for each frame are found by linking the conventional static snake images through time to form a dynamic snake. At first, the static snakes are guided by three forces from the points within the frame, namely, repulsion from other snake points, attraction to the expected midpoint (regularization), and attraction to the edges of the frame. After this isolated frame optimization, we add a fourth force, a time regularization force which expresses attraction to a time interpolation point. The fourth force links the series of static snakes into a single dynamic (volumetric) snake. The dynamic snake tolerates motion errors by leveraging both past and future information. For robustness, the dynamic snake has only six points per frame.

The object centers and radii (boundaries) 104 are estimated from the dynamic snake using, for example, 16×16 pixel blocks. Usually, the center information is much better than the boundary information, i.e., the approximate radii.

Phase II: Pixel-Level Boundary Refinement

Figure 2:
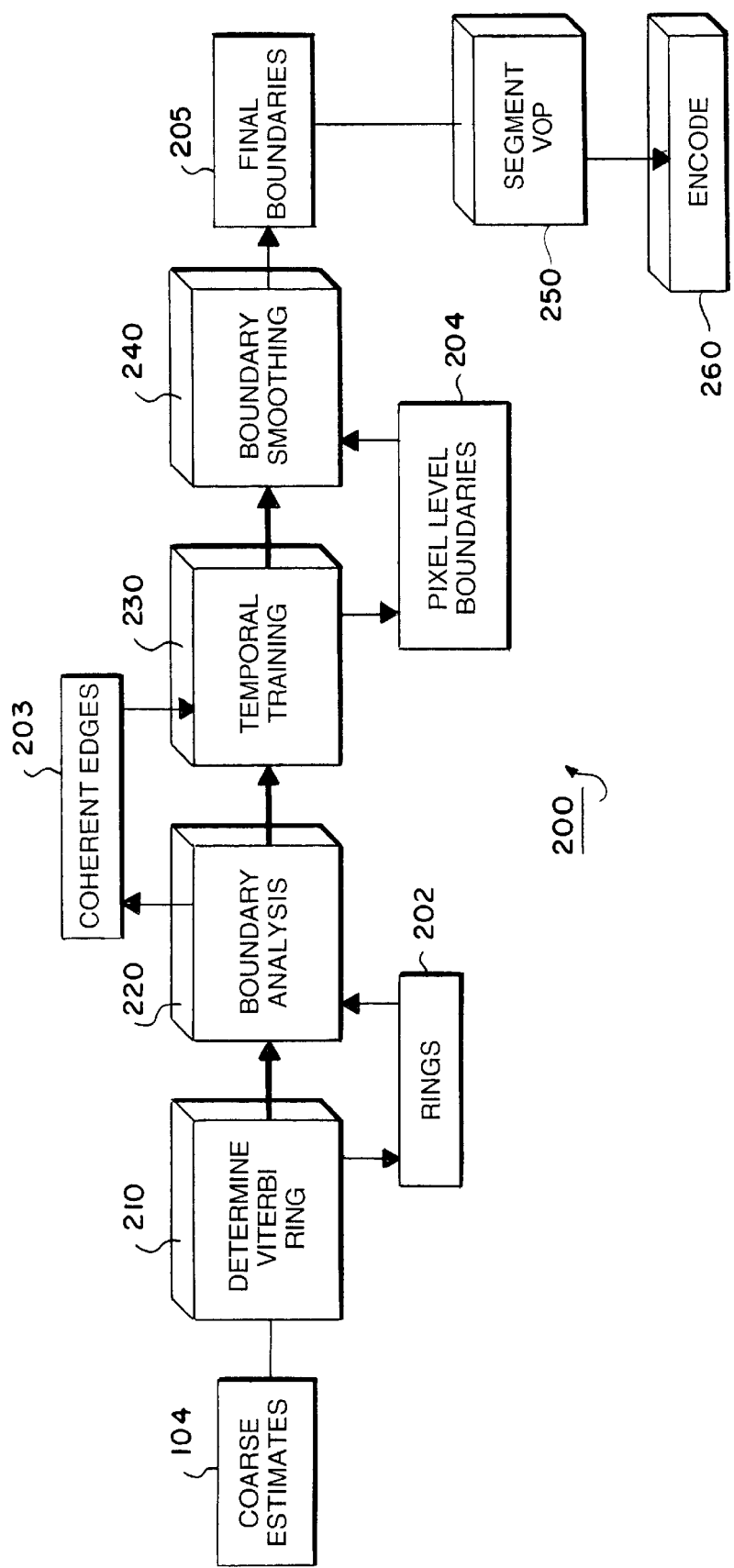
FIG. 2 is a flow diagram of a training phase for producing fine object boundaries from coarse object boundaries.

The second phase 200 shown in FIG. 2 derives pixel-resolution boundaries by integrating motion information, and temporal training based upon the constrained Viterbi search.

Viterbi Paths

The Viterbi search 210 finds a manageable and relevant subset of edges that possibly can form a boundary, for example, rings 202. For a given single object, the vast majority of edge segments in the image are irrelevant to the boundary determination. To avoid a costly analysis over all possible edge segments, we find a set of concentric and mutually exclusive boundaries estimates to determine a closed contour around the estimated center. Edges in the contour are removed from the edge map, and the process is repeated until an optimal solution is found. Because edge motion tends to coincide with visual edges, the set of Viterbi rings 202, in practice, will contain most of the boundary edges of the object.

Figure 3:
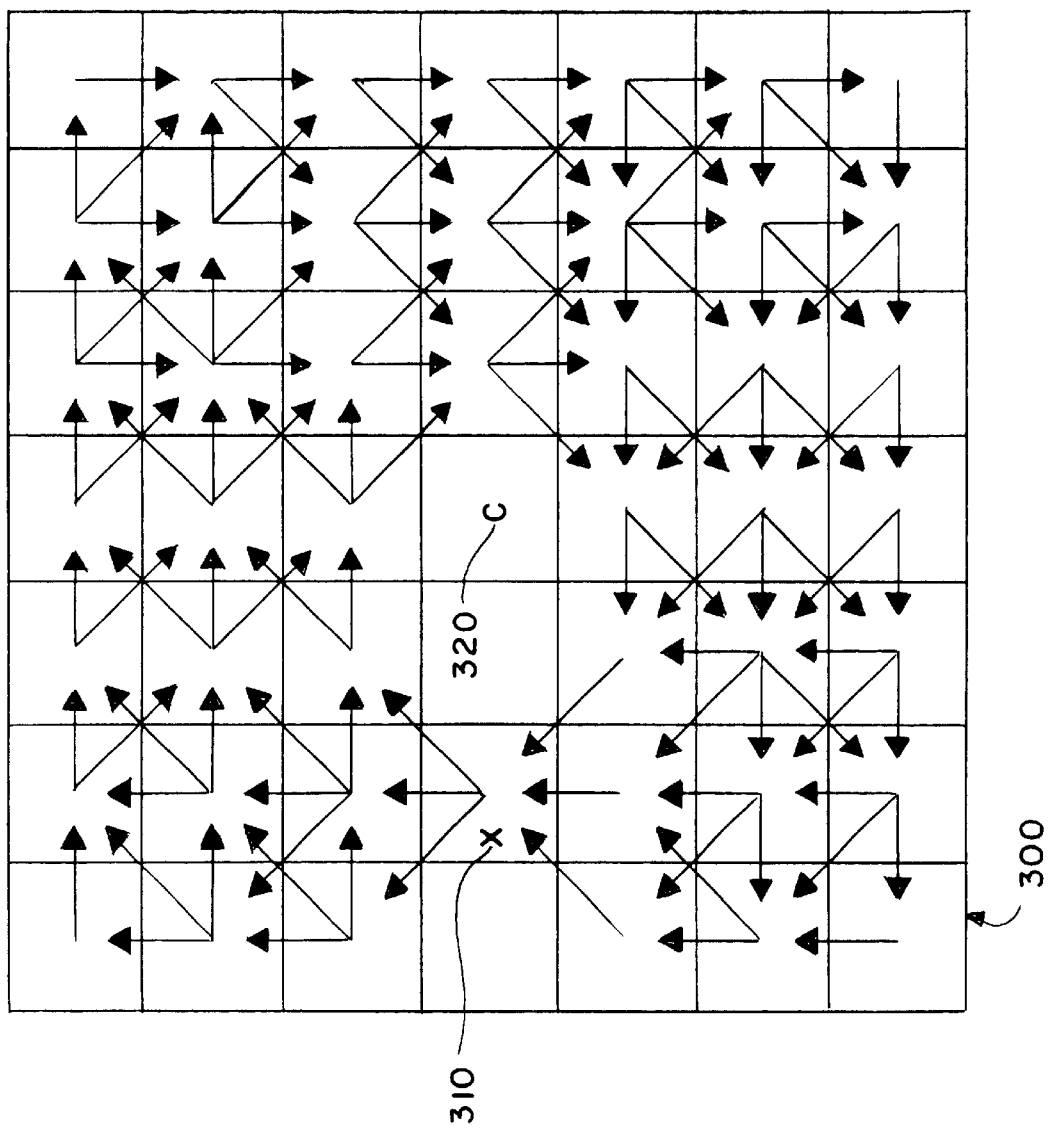
FIG. 3 is a block diagram of possible paths in a lattice to produce constrained Viterbi paths.

In greater detail, the constrained Viterbi search considers the boundary problem as a path-finding problem under a score formulation. FIG. 3 shows possible paths for a 7×7 image 300. The directed arrows in FIG. 3 generally show a clock-wise movement around the center 320. Given a point (x) 310 on the boundary and a center point (C) 320, a possible path is subject to the following two constraints:

(1) The boundary can be described as a radial function dependent only on the angle, i.e., the boundary can be described as a set of points which follow the formulation:

$$r = f(\theta) \quad [1]$$

(2) The score function follows the condition:

$$\max E(x_1, \ldots, x_n, x_{(n+1)}) = f_{score}(\max(E(x_1, \ldots, x_n), R(x,y)) \quad [2]$$

where $(x_1, \ldots, x_n, x_{(n+1)})$ is a path, $(x_1, \ldots, x_n))$ is another path minus one pixel, and $R(x, y)$ is called the constrained Viterbi image, a function of the point position.

Given an image $I(x,y,t)$, one can only link together those pixels which follow these the constraints specified above.

1) From Eq. 1, as one follows the boundary in one direction, the pixels' angle to a given center must always be monotonically increasing, or decreasing.

2) From Eq. 2, $f_{score}$ only depends on the maximum score of the path up to previous linked boundary point.

A maximum possible path has a linear order that is dependent on the angle of the pixels to the center. Thus, the graph of all possible paths in the problem has topological order and therefore must be an directed acyclic graph. By successively applying Eq. 2 to the graph, the optimal solution for the boundary problem may be found in this manner. Furthermore, since a pixel can only be bounded by a finite number of other pixels, the number of edges in the graph must be bounded by a constant times the number of pixels. These constraints provide a significant computational savings in comparison to the classical Viterbi algorithm and also are widely applicable for many boundary finding problems as described below.

Boundary Motion Coherence

The Viterbi rings 202 are used in a boundary analysis step 220 to enhance edge segments whose surrounding motions imply boundary membership. By considering an edge segment and its immediate neighborhood, coherent edges can be determined by considering the motions of the inside, outside and edge regions, and the normal to edge. The boundary motion coherent edges 203 are passed to a temporal training step 230.

Temporal Training

From the set of the motion enhanced images and object tracking estimates of boundary radius and center points, we temporally train the system to converge to pixel-level object boundaries 204. Each iteration of the temporal training has two parts: The constrained Viterbi search passes on each frame's enhanced image, followed by a parametric reestimation under the assumption of temporal smoothness. The reestimation results are then factored back into the constrained Viterbi by adjustments to the enhanced images, the smoothing of temporal score function parameters, and the appropriate warping to the trellis diagram. The temporal training 230 iterates until boundary estimates converge, or a predetermined number of iterations.

Boundary Smoothing

In its pursuit of a best path, the constrained Viterbi may leave a jagged boundary. The final step 240 smoothens the pixel-level boundaries 204 by effectively applying a low-pass filter. It should be noted that the smoothing can be performed during the temporal training 230.

Segmenting and Encoding

After the final boundary 205 has been obtained, the object can be segmented 250 to produce a VOP. The VOP can be encoded 260 using, for example, the MPEG-4 standard.

Applications

Although the invention has been described with reference to segmenting a video sequence, it should be understood, that our method can be used in many dynamic programming environments where boundaries need to be estimated. Our method can be used to estimate a 1D boundary, a 2D boundary, a 3D boundary, or boundaries in environments having higher degrees of dimensionality. It should also be understood that the "boundary" does not need to perfectly circular, or for that matter a closed loop. For example, the boundary can be a spiral, because a spiral satisfies the constraint that the angle is always increasing (or decreasing) as it is followed. Paths of other forms can likewise be searched by specifying other, perhaps non-circular constraints.

1D Boundary Detection

Boundary detection using our Viterbi search proceeds as follows. Given a two-dimensional intensity representation, for example, an image I(x,y), one can formulate a score function to locate an intensity boundary B in the representation.

Using some type of boundary detection analysis, for example, a Sobel edge filter, or a Gaussian filter, one can apply a convolution kernel $K_{edge}$ over the representation I(x,y) to produce an enhanced image R(x,y).

$$R(x,y)=K_{edge}*I(x,y)$$

Formulate a simple score function with a small number of parameters. To locate a candidate B, maximize the following function by the application of the constrained Viterbi search.

$$score(t)=C_{memory} \cdot score(t-1)+f(t)$$

where t denotes the current pixel position, t−1 denotes the previous pixel position, score(i) is the cumulative score after i decisions, $f(i)$ is a function of the intensity value at node i in the constrained Viterbi trellis. The function $f()$ is flexible in that it can be a function of a single pixel, or some neighborhood around the pixel. In the most simple and present case, $f()$ is a measure of edge strength. Note, a small 3×3 neighborhood can be used to calculate this value. In general, F() can be any function of the intensity values, not even necessarily at the same time instant.

2D Edge Candidate Search

In many cases, some motion analysis requires a priori knowledge of the boundary. The constrained Viterbi search allows for an efficient search by finding a relevant subset of edges in the following manner. Given an image I(x,y), run an edge detection algorithm to get an enhanced image R(x,y). Choose a set of possible starting points, and an object center. Apply the constrained Viterbi search on the enhanced image with one of the starting points to get a boundary estimate B. Remove edges associated with the boundary estimate, reapply the constrained Viterbi search for another starting point.

The set of boundary estimates {B} returned by this process is a set of edges that have a high probability of being associated with the object. Because the edges are centered around the object, the edges tend to be orthogonal to the object center, and the edges are part of a closed contour that encompasses the object center.

3D Video Object Segmentation

In video object segmentation, we can formulate an energy function for a surface E(S). The energy function can be maximized to find a good estimate of the object boundary B at successive time instants. A general form for energy function is:

$$E(S)=c_1 \cdot E_{motion}(S)+c_2 \cdot E_{visual}(S)+c_3 \cdot E_{smooth}(S)$$

where the terms respectively express motion discontinuity, visual discontinuity, and smoothness. The energy function at a point can be split into two parts: one that is dependent on the intensity of the frame or the shape of the surface; and the other that is dependent of the shape of the surface through time.

$$E(x,y,t) \approx E_{image}(x,y,t)E_{time}(x,y,t),$$

The first term is only dependent on the image or shape S(x,y). The shape can be found by edge detection and motion analysis. The second term is time dependent, and subject to temporal smoothing.

When we maximize this surface with respect to E(S), we will approximate surface optimization as a series of boundary optimizations. This can be done iteratively as follows.

General Iterative Constrained Viterbi Search

Figure 4:
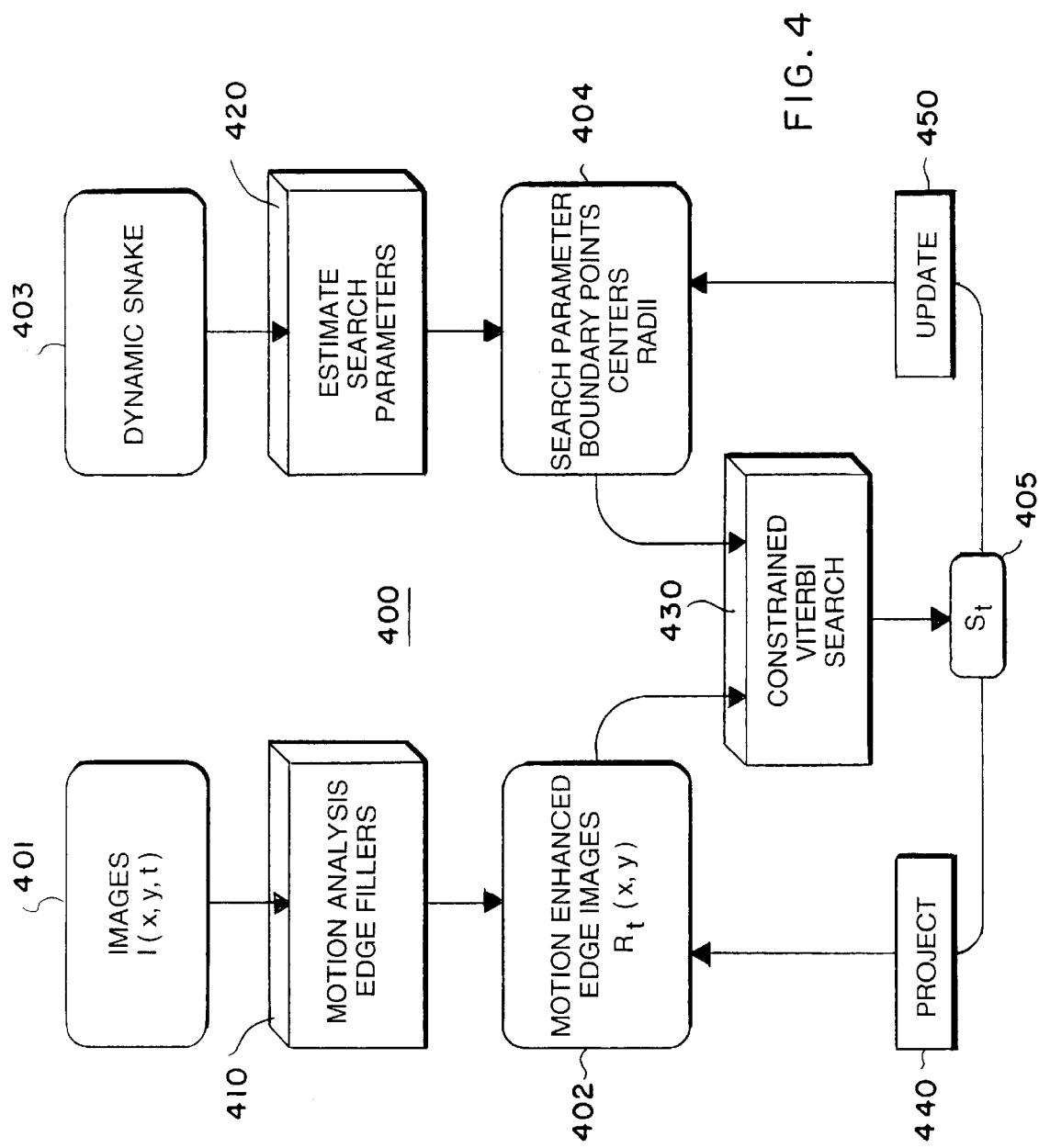
FIG. 4 is a block diagram of a segmentation process using a constrained Viterbi search.

FIG. 4 shows the general form of our iterative and constrained Viterbi search 400. For each image I(x,y,t) 401, apply filtering and motion analysis 410 to produce an initial motion enhanced image $R_t(x,y)$ 401. From a dynamic snake 403, derive 420 initial search parameters 404. The search parameters 404 include a boundary centers, points, and radii. The boundary centers are usually good estimates, the points and radii are sufficient for the purpose of initialization. The search parameters 404 and enhanced image 402 are searched 430 for a boundary estimate $S_t$ 405 for each time step.

In order to propagate surface smoothness, the boundary estimate 405 is projected 440 into the enhanced image 402 of the previous, current, and next frame. The estimate is also used to update 450 the search parameters. Then, the constrained Viterbi search 430, projecting and updating are repeated until the boundary estimate converges.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for detecting a boundary in a two-dimensional image of intensity value points, comprising the steps of:
    applying a convolutional kernel to the intensity value points of the image to produce an enhanced image;
    supplying a boundary score function;
    maximizing the boundary score function using a constrained Viterbi search to determine the boundary.

2. The method of claim 1 wherein the constrained Viterbi search follows intensity value points of a potential boundary in the image in only one angular direction, and wherein the boundary score function is maximized up to a last intensity value points linked to the potential boundary.

3. The method of claim 2 wherein the angular direction is increasing.

4. The method of claim 2 wherein the angular direction is decreasing.

5. The method of claim 2 further supplying the search parameters comprises:
    estimating a center of the boundary;
    estimating a radius of the boundary; and
    estimating a first intensity value point on a potential boundary to locate an edge portion of the boundary.

6. The method of claim 5 wherein the maximizing and estimating steps are iteratively repeated until a termination condition is reached.

7. The method of claim 6 wherein the repeating terminates when the potential boundary converges.

8. The method of claim 6 wherein the repeating terminates after a predetermined number of iterations.

9. A method for detecting a boundary in a sequence of two-dimensional images, each image having a plurality of intensity value points, comprising the steps of:
    filtering and motion analyzing each image to produce enhanced images;
    determining initial search parameters from the enhanced images;
    defining search constraints;
    searching each enhanced image for a potential boundary using the search parameters, the search constraints, and a Viterbi search; and
    projecting the potential boundary into the enhanced image of a previous, current, and next image;
    updating the search parameters for the previous, current, and next image; and
    repeating the constrained searching, projecting, and updating until the potential boundary converges on a final boundary.

10. The method of claim 1 further including smoothing the final boundary.

11. The method of claim 1 further including segmenting a video object plane using the final boundary.

12. The method of claim 1 further including encoding the video object plane.

13. A method of determining a boundary of an object included in an image, comprising:
    predicting a boundary representing the object included in the image;
    determining a reference point corresponding to the predicted boundary; and
    determining the boundary of the object in the image based on the determined reference point and the predicted boundary.

14. A method according to claim 13, wherein the reference point is a predicted boundary center point of the predicted boundary.

15. A method according to claim 13, wherein:
    determining the boundary includes determining a relationship between the predicted boundary and the determined reference point.

16. A method according to claim 13, segmenting the object based on the determined boundary to form a separate video object plane.

17. A method of determining a boundary of an object included in an image, the image being one of multiple images represented in multiple video frames, each of the multiple images including the object, comprising:
    predicting boundaries, each representing the object included in a respective one of the multiple images;
    determining reference points, each of the determined reference points corresponding to a respective one of the predicted boundaries; and
    determining the boundary of the object in the image included in the multiple video frames, based on the determined reference points and the predicted boundaries.

18. A method according to claim 17, wherein predicting the boundaries includes:
    partitioning each of the multiple video frames into blocks;
    performing motion estimation on each of the blocks of each of the multiple video frames in relation to the blocks of a prior one of the multiple video frames and a subsequent one of the multiple video frames to derive motion field information for that one video frame; and
    the predicted boundary representing the object included in the image in the one video frame is predicted based on the motion field information derived for that one video frame.

19. A method according to claim 18, wherein:
    predicting boundaries further includes deriving a one-dimensional intensity map for the one video frame based on the motion field information derived for that one video frame.

20. A method according to claim 17, wherein the predicted boundaries are predicted third boundaries and predicting the predicted third boundaries includes:
    predicting first boundaries, each of the predicted first boundaries representing the object included in the image in a respective one of the multiple video frames, and
    predicting second boundaries, each of the predicted second boundaries being based on a first relationship between (i) each point along each of the predicted first boundaries and (ii) at least one of its corresponding reference point, other points along that predicted first boundary, and edges of the respective video frame having the image including the object represented by that predicted first boundary; and each of the predicted third boundaries is based on a second relationship between (i) each of the predicted second boundaries and (ii) one or more of the other of the predicted second boundaries.

21. A method according to claim 20, wherein:

the one or more other predicted second boundaries are two other predicted second boundaries;

the video frame having the image including the object represented by one of the two other predicted second boundaries precedes the video frame having the image including the object represented by the predicted second boundary to which it is being related; and the video frame having the image including the object represented by the other of the two other predicted second boundaries is subsequent to the video frame having the image including the object represented by the predicted second boundary to which it is being related.

22. A method according to claim 17, wherein determining the boundary includes:

determining mutually exclusive estimated boundaries based on a relationship between each of the predicted boundaries and the determined corresponding reference point; and determining the boundary based on relationships between respective of the determined mutually exclusive estimated boundaries.

23. A method according to claim 22, wherein determining the boundary includes:

modifying each of the determined mutually exclusive estimated boundaries based on a radial function and angles to the determined corresponding reference point of points along that determined mutually exclusive estimated boundary;

determining the boundary based on relationships between respective of the modified mutually exclusive estimated boundaries.

24. A method of detecting a boundary of an object included in an image, comprising:

predicting a boundary of the object;

enhancing the predicted boundary;

establishing Viterbi search parameters corresponding to a radial function; and performing a Viterbi search, constrained by the established Viterbi search parameters, on the enhanced predicted boundary to determine the boundary of the object.

\* \* \* \* \*